United States Patent [19]
Edwards et al.

[11] Patent Number: 5,191,222
[45] Date of Patent: Mar. 2, 1993

[54] APPARATUS FOR SYNCHRONIZING DATA READING CAPABILITIES OF AN OPTICAL READER

[75] Inventors: Robert J. Edwards, Ridgefield; Kenneth W. Lowell, Farmington, both of Conn.

[73] Assignee: Pitney Bowes Inc., Stamford, Conn.

[21] Appl. No.: 781,432

[22] Filed: Oct. 23, 1991

[51] Int. Cl.$^5$ .................. G06K 7/015; G06K 7/10
[52] U.S. Cl. .................. 250/561; 250/560; 250/239; 250/223 R; 250/559
[58] Field of Search .................. 235/454; 74/89.15; 250/239, 223 R, 559, 557, 561, 560; 281/2

[56] References Cited

U.S. PATENT DOCUMENTS

| | | | |
|---|---|---|---|
| 3,795,007 | 2/1974 | Mohrman et al. | 250/561 |
| 4,084,099 | 4/1978 | Harvey et al. | 250/561 |
| 4,738,442 | 4/1988 | Rodi et al. | 250/561 |
| 5,007,739 | 4/1991 | Shimano et al. | 250/560 |

Primary Examiner—John Shepperd
Assistant Examiner—Esther Chin
Attorney, Agent, or Firm—Charles R. Malandra, Jr.; Melvin J. Scolnick

[57] ABSTRACT

A mounting apparatus for an optical reader which provides adjustment of the reader along two axes. The apparatus comprises a support member having a slotted section defined by first and second arms projecting from each end of the support member and extending in a second direction perpendicular to the first direction. There is a plate member adjacent and operatively coupled to the support member for clamping the support member to the support shaft, whereby the support member can be adjustably positioned in the first direction. A travelling nut is slidably positioned in the slotted section, and has an aperture in which the optical reader is held. The travelling nut includes a threaded hole engaged by a threaded portion of a thumb screw. The thumb screw extends through apertures in the first and second arms and into the slotted section for adjusting the position of the travelling nut in the second direction.

9 Claims, 4 Drawing Sheets

APPARATUS FOR SYNCHRONIZING DATA READING CAPABILITIES OF AN OPTICAL READER

FIELD OF THE INVENTION

The present invention relates to the reading by an optical reader of control marks printed on sheets of paper being conveyed for further processing, and more particularly, to a plurality of optical readers simultaneously reading a plurality of control marks on one or more sheets.

BACKGROUND OF THE INVENTION

In paper handling machines, such as inserting machines, the use of an optical reading devices, for example, bar code readers, are well known. Generally, such optical readers are mounted in an appropriate location along the path in which the paper is conveyed for reading certain marks, for example, bar codes, that are preprinted on the sheets being conveyed. Typically, these marks are control marks which identify further processing to be performed downstream from the optical reader and which are situated at a fixed location on the sheets of a particular batch or "run" of material being processed.

It is known that an optical reader can be adjustably mounted along a paper path so that the reader can be positioned in a side-to-side or transverse direction to the paper path. In this manner, the optical reader can be positioned according to the location of the marks on the sheets being processed. It is common that an adjustment to the optical reader position is necessary when a new and different run of material is initiated, because the new run may contain control marks at a different location than the previous run, or the size of the sheets being processed may be different. Such adjustable mounting of an optical reader provides a capability to the paper handling machine for processing other runs of sheet material regardless of sheet size or location of the control marks. Typically, this type of adjustment is a course adjustment because the field of view of the optical readers do not require a delicate adjustment to read the control marks.

Presently, there is a need to read simultaneously multiple marks situated on a single sheet. The marks must be scanned as the sheet is fed from a sheet feeder. In one application, the marks represent control marks for at least two sheets which are initially printed as part of the single sheet being read and which are to be separated into two sheets when the single sheet is later split for further processing. The normal registration of the sheet being read does not ensure the simultaneous reading of multiple marks printed on the sheet. From one batch to another the location of the marks relative to one another may differ, for example, because one batch may have been printed on a different printer than the previous batch.

Although it is known to mount one optical reader on a mounting apparatus which allows for transversely adjusting the position of the reader over the location of the marks as the sheet is conveyed, such an arrangement does not provide a way to ensure that a plurality of readers are precisely positioned in a second direction to read a plurality of marks on a single sheet simultaneously. The typical mounting of optical readers provides only course adjustments which make it difficult to synchronize the reading of multiple optical readers. A fine adjustment of the relative positions of each reader is needed to synchronize the reading of the optical readers.

In U.S. Pat. No. 5,028,040 issued to Kalisiak on Jul. 2, 1991, there is shown an apparatus and method relating to registration marks applied to a form for insuring that the corresponding transversely adjacent form parts lie in length-wise registration with one another. In this patent, a pair of optical sensors are aligned with the path of travel of the registration marks on separated or overlapped form parts for detecting registration marks on each of the overlapped form parts. This patent does not show or suggest any device or method of adjustably positioning the optical readers for simultaneously reading control marks.

SUMMARY OF THE INVENTION

It has been found that an optical reader can be mounted into a bracket assembly which can be adjustably positioned along a first direction, for example a direction transverse to the paper path, and which includes an adjustment mechanism for finely adjusting the position of the optical reader in a second direction, for example a direction normal to the paper path, i.e., the upstream/downstream direction. It has been found that for a plurality of optical readers, each mounted to the bracket assembly, the reading of the respective control marks on a sheet being conveyed by the plurality of the readers can be synchronized to occur simultaneously. It has been found that the present invention provides a mounting apparatus for an optical reader which provides such adjustments of optical readers along two axes.

In accordance with the present invention, there is provided a mounting apparatus for an optical reader which provides adjustment of the reader along two axes. The apparatus comprises a support member having a slotted section defined by first and second arms projecting from each end of the support member and extending in a second direction perpendicular to the first direction. There is a plate member adjacent and operatively coupled to the support member for clamping the support member to the support shaft, whereby the support member can be adjustably positioned in the first direction. A travelling nut is slidably positioned in the slotted section, and has an aperture in which the optical reader is held. The travelling nut includes a threaded hole engaged by a threaded portion of a thumb screw. The thumb screw extends through apertures in the first and second arms and into the slotted section for adjusting the position of the travelling nut in the second direction.

BRIEF DESCRIPTION OF THE DRAWINGS

A complete understanding of the present invention may be obtained from the following detailed description of the preferred embodiment thereof, when taken in conjunction with the accompanying drawings wherein like reference numerals designate similar elements in the various figures, and in which.

DESCRIPTION OF THE PREFERRED EMBODIMENT

Figure 1:
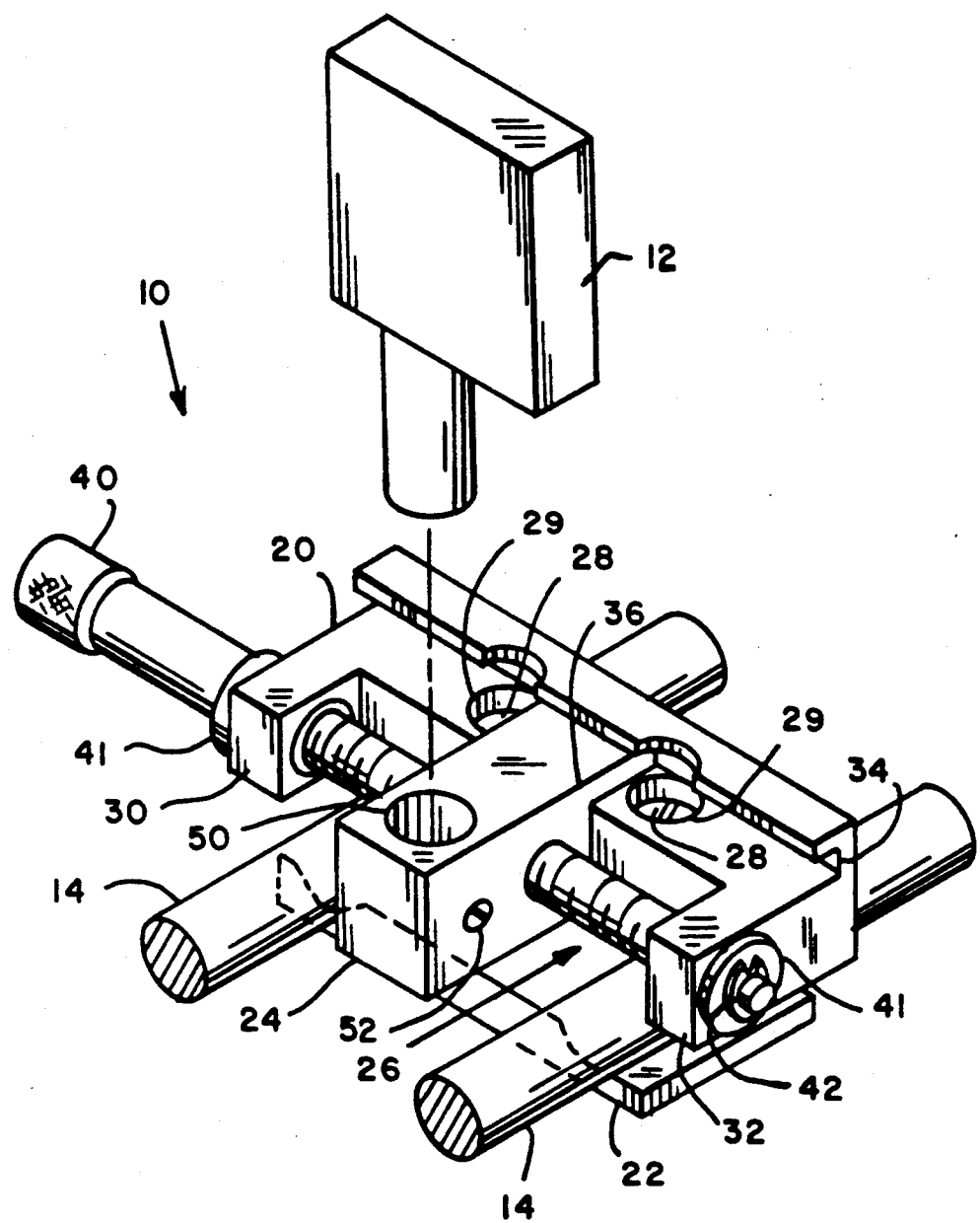
FIG. 1 is a perspective view of the bracket assembly in accordance with the present invention.

In describing the preferred embodiment of the present invention, reference is made to the drawings wherein there is seen an optical reader mounting assembly, generally designated 10, for mounting an optical reader 12 to a pair of shafts 14 extending in a transverse direction to a paper path, for example in an inserting machine. Reader mounting assembly 10 includes a support member 20, a lower plate 22, a travelling nut 24 and a thumb screw 40. Support member 20 is generally rectangular in shape with ears 30 and 32 at each end defining a slotted section 26 in which travelling nut 24 is located. The bottom surface of support member 20 and the top surface of lower plate 22 are correspondingly indented for accepting and clamping shafts 14 when reader mounting assembly 10 is clamped to shafts 14. Screws 28 are inserted into support member 20 at recessed holes 29 and engage corresponding threaded sections of lower plate 22 for clamping reader mounting assembly 10 to shafts 14. It will be understood by those skilled in the art that this arrangement provides a coarse adjustment of assembly 10 in the transverse direction.

Extending across the non-slotted section of support member 20 and parallel to slotted section 26 is a guide track 34. Travelling nut 24 is generally rectangular in shape having an arm 36 extending at one end. Travelling nut 24 fits into slotted section 26 with arm 36 resting on support member 20 and slidably situated in guide track 34.

Thumb screw 40 is a shoulder screw having a knurled head and a plurality of sections with decreasing diameters as thumb screw 40 extends through apertures in ears 30 and 32. In the preferred embodiment of the present invention, plastic flange bearings 41 having a low coefficient of friction are used in the apertures of ears 30 and 32 to provide ease of turning of thumb screw 40. The first section of thumb screw 40 has a diameter which is larger than the inner diameter of bearing 41 in ear 30. The length of the remaining sections of thumb screw 40 is sufficient for the tip of thumb screw 40 to extend through the orifice in ear 32. The tip of thumb screw 40 includes a e-ring groove for accepting an e-clip 42 which prevents thumb screw 40 from withdrawing from bearing 41 in ear 32. A threaded section of thumb screw 40 resides within slot section 26. The threaded section comprises fine threads which match and engage the threaded orifice in travelling nut 24.

In operation, when thumb screw 40 is rotated in the clockwise direction, the travelling nut 24 moves towards ear 30. When thumb screw 40 is rotated in the counterclockwise direction, travelling nut 24 moves towards ear 32. It has been found that threaded thumb screw 40 provides an infinite adjustment that is mechanically made possible by the fine threads of the screw. In the preferred embodiment of the present invention, a fine threaded lead screw is used. It will be understood by those skilled in the art that other types of linear adjustment devices, such as a friction fitting member inserted in the travelling nut and resting on a plain round diameter shaft, can be used in an alternate embodiment. Another alternate embodiment includes a slotted shaft with an allen screw adjustment of the travelling nut along the shaft. A further embodiment includes a lever securing the slidable travelling nut to the support member.

It can be seen that the cooperative action of guide track 34 and thumb screw 40 act to stabilize travelling nut 24 during adjustments for positioning optical reader 12. It has been found that with the present invention a locking mechanism is not needed to secure travelling nut 40 once the optical reader is positioned properly. The weight of optical reader 12 inserted into travelling nut 24 provides adequate tension between the fine threads in travelling nut 24 and thumb screw 40 to prevent any turning of thumb screw 40 during normal the operation of an inserting machine. In the preferred embodiment of the present invention, the threaded sections are ¼-32 sized threads. In the event that it becomes necessary to add a locking device to the reader assembly, a spring can be added to provide tension between one or both of ears 30 and 32 and the travelling nut 24.

Optical reader 12 is inserted into an orifice 50 of travelling nut 24 and is locked in place by, for example, an allen set screw 52. This arrangement provides a height adjustment of optical reader 12 relative to sheet 5 being scanned.

Figure 2:
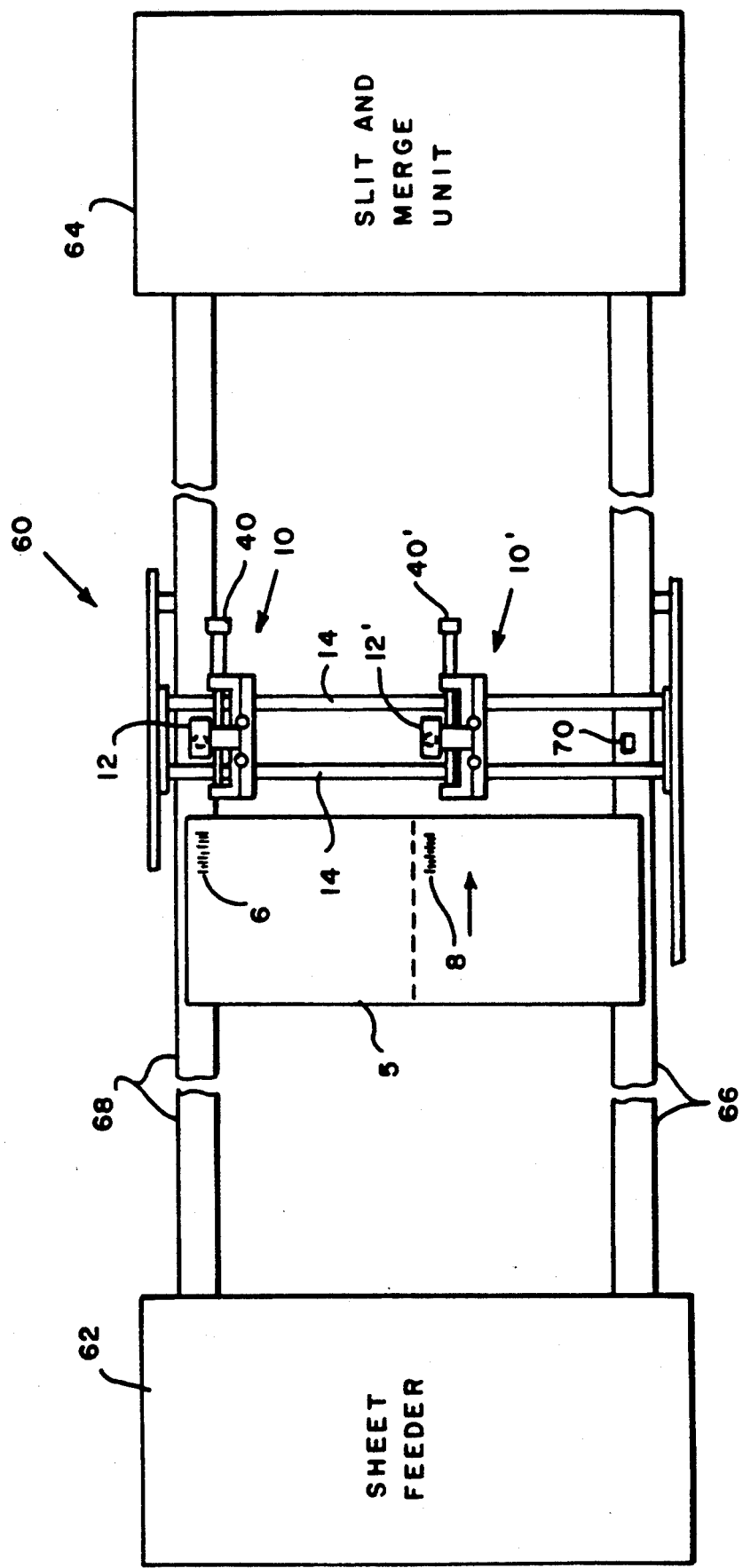
FIG. 2 is a plan view of the bracket assembly, seen in FIG. 1, configured as part of an inserting machine represented in schematic form.
Figure 3:
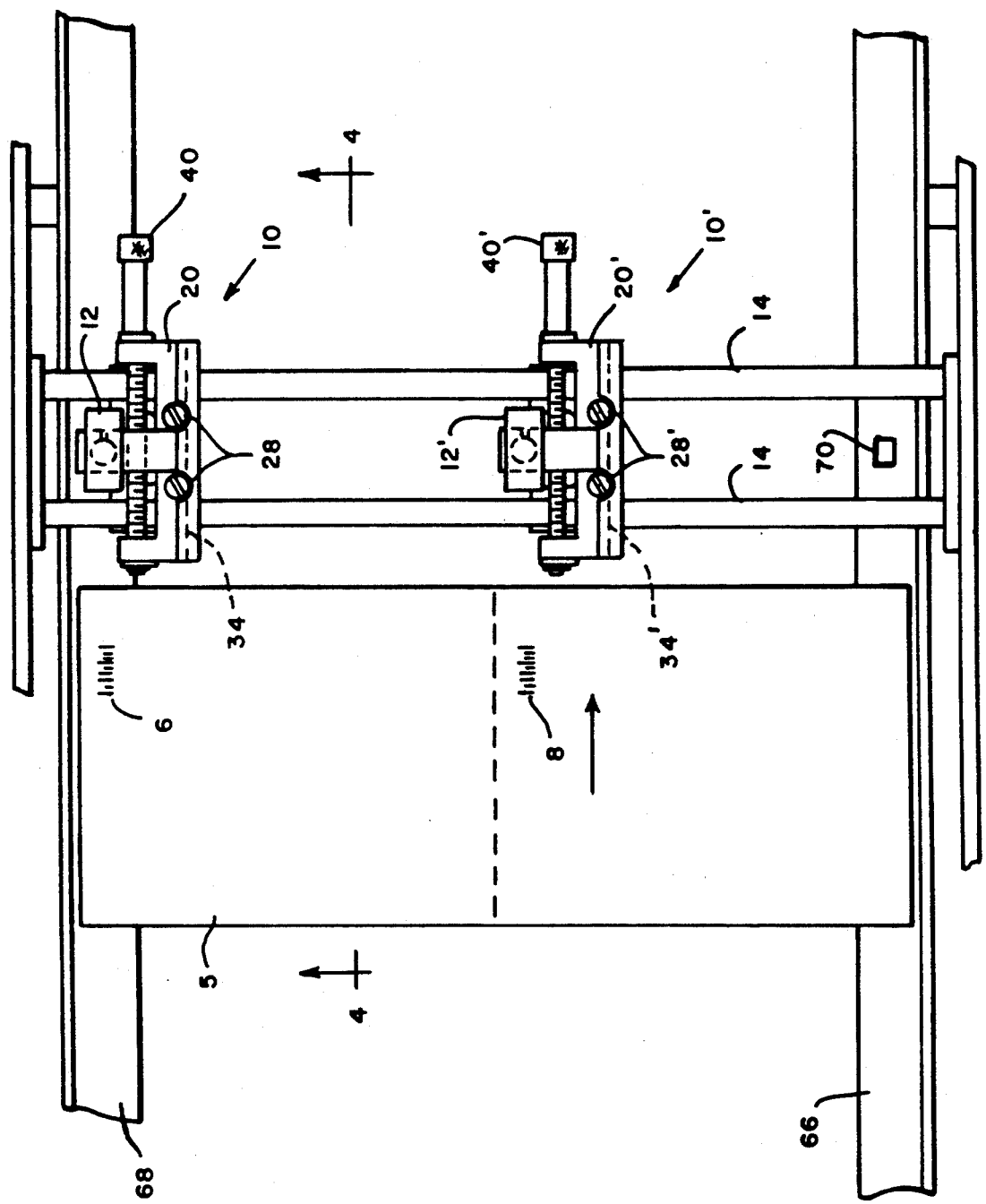
FIG. 3 is an enlarged plan view of the configuration seen in FIG. 2.

Referring now to FIG. 2, an application of the preferred embodiment of the present invention is shown wherein there is seen an upstream section of an inserting machine, generally designated 60, including a sheet feeder 62 and a slit and merge unit module 64. In the preferred embodiment of the present invention, a single sheet 5 containing two sets of control marks 6 and 8 is fed from sheet feeder 62. There are two reader mounting assemblies 10 and 10' each for reading one of the marks. Registration of sheet 5 is maintained by side guides 66 and 68. Before sheet 5 is slit, separated and then merged by slit and merge module 64, control marks 6 and 8 are scanned by optical readers 12 and 12'. It is necessary that the scanning of the marks is done simultaneously. It is well known in the art to adjust the position of readers 12 and 12' along the transverse direction of the paper path by sliding reader mounting assembly 10 and 10' along shafts 14. The present invention allows an additional adjustment to the positioning of readers 12 and 12' in the upstream/downstream direction by turning thumb screws 40 and 40'.

Heretofore, such an adjustment would require that a service technician be called in to perform the fine adjustment to the position of the readers in the upstream/downstream direction. It will be appreciated that such a requirement impacts the downtime of the machine just to synchronize the reading by the two readers. It has been found that the present invention eliminates the need for such a service call. The present invention provides an operator adjustable reader mounting assembly 10 for synchronizing the reading by readers 12 and 12'.

Figure 4:
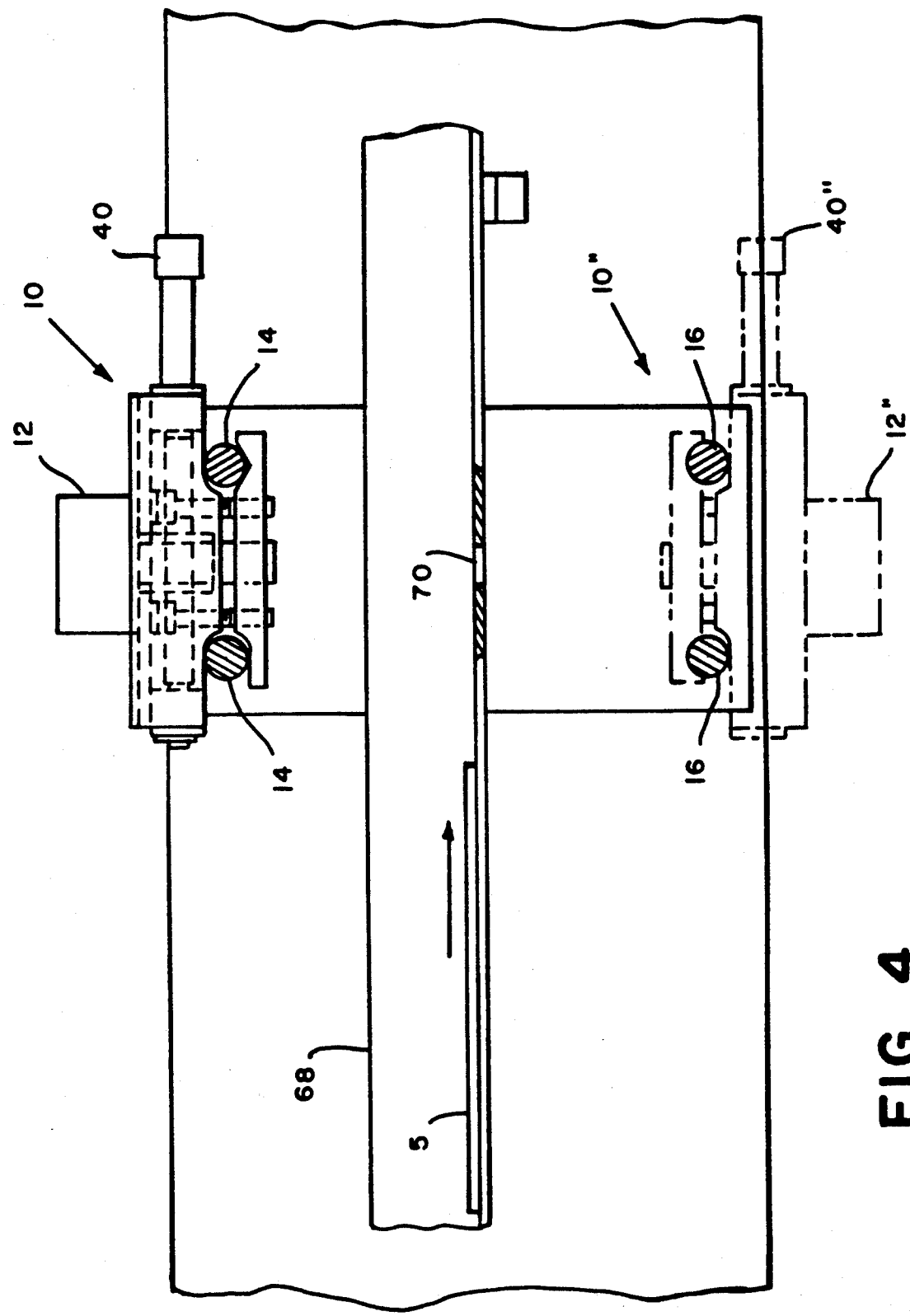
FIG. 4 is side elevational view taken along lines 4—4 in FIG. 3.

Referring now to FIG. 4, there is seen a side elevational view of the present invention. It has been found that the present invention is suitable for adjustably mounting an optical reader to scan from above and below the paper path. Drawn in phantom in FIG. 4 is a reader mounting assembly 10" mounted to shafts 16 for scanning control marks on the bottom side of the sheet 5. To accommodate marks that may appear along the outer edges of sheet 5, side guides 68 and 66 include an aperture 70 for scanning from below the paper path whereby the reader can be positioned under the side guide for reading control marks passing over aperture 70.

The reader mounting assemblies 10 and 10' are made in a right handed configuration whereby readers 12 and 12' are situated on the same side of reader assemblies 10 and 10', i.e., the side facing side guide 68. It will be understood that assembly 10' can be reversed in its mounting so that reader 12' can be positioned over side guide 66. In the alternative, assembly 10' can be reversibly assembled whereby thumb screw 40' is inserted at through ear 32 and then e-clipped at arm 30 so that reader 12' can be positioned over side guide 66.

It will be understood by those skilled in the art that the present invention can be used in an alternate configuration in a paper handling machine whereby the fine adjustment is made in the transverse direction and the coarse adjustment is made in the normal direction.

It will be appreciated by those skilled in the art that there has been described a novel apparatus for providing an apparatus for synchronizing data reading capabilities of an optical reader. Now that the present invention has been described in conjunction with specific embodiments thereof, many alternatives, modifications and variations will be apparent to those skilled in the art. Accordingly, it is intended for the present invention to embrace all such alternatives, modifications and variations that follow within the spirit and scope of the appended claims.

What is Claimed is:

1. An apparatus for adjustably mounting an optical reader to at least one support shaft extending in a first direction, comprising:
   a support member having a slotted section extending in a second direction perpendicular to the first direction;
   a plate member adjacent and operatively coupled to said support member for clamping said support member to the support shaft, whereby said support member can be adjustably positioned in said first direction;
   a travelling nut slidably positioned in said slotted section, and having an aperture in which the optical reader is held; and
   means operatively coupled to said support member for adjusting the position of said travelling nut in said second direction.

2. The apparatus according to claim 1 wherein said travelling nut includes a threaded hole and said adjusting means includes a threaded section for engaging said threaded hole in said travelling nut.

3. The apparatus according to claim 1 wherein said adjusting means includes a thumb screw extending through said slotted section, said thumb screw having a knurled end with a diameter larger than a diameter of an aperture in said support member.

4. The apparatus according to claim 1 wherein said support member includes a channel extending parallel to said slotted section, said channel operating as a guide for said travelling nut.

5. The apparatus according to claim 1 wherein said travelling nut includes a screw for securing the alignment of the optical scanner.

6. An apparatus for adjustably mounting an optical reader to at least one support shaft extending in a first direction, comprising:
   a support member having a slotted section defined by first and second arms projecting from each end of said support member, said slotted section extending in a second direction perpendicular to the first direction;
   a plate member adjacent and operatively coupled to said support member for clamping said support member to the support shaft, whereby said support member can be adjustably positioned in said first direction;
   a travelling nut slidably positioned in said slotted section, and having an aperture in which the optical reader is held, said travelling nut including a threaded hole; and
   means extending through apertures in said first and second arms and into said slotted section for adjusting the position of said travelling nut in said second direction, said adjustment means including a threaded section for engaging said threaded hole in said travelling nut.

7. The apparatus according to claim 6 wherein said adjusting means includes a thumb screw having a knurled end, and said first and second arms include bearing means in said apertures, said knurled end of said thumb screw having a diameter larger than a diameter of said bearing means in said first arm.

8. The apparatus according to claim 6 wherein said support member includes a channel extending parallel to said slotted section, said channel operating as a guide for said travelling nut.

9. The apparatus according to claim 6 wherein said travelling nut includes a screw for securing the alignment of the optical scanner.

* * * * *